United States Patent
Nagai et al.

(10) Patent No.: US 12,429,370 B2
(45) Date of Patent: Sep. 30, 2025

(54) HOPPER ATTACHMENT STRUCTURE AND WEIGHING DEVICE COMPRISING SAME

(71) Applicant: YAMATO SCALE CO., LTD., Akashi (JP)

(72) Inventors: Takayuki Nagai, Akashi (JP); Ryo Shimizu, Akashi (JP); Ryo Suemichi, Akashi (JP)

(73) Assignee: Yamato Scale Co., Ltd., Akashi (JP)

( * ) Notice: Subject to any disclaimer, the term of this patent is extended or adjusted under 35 U.S.C. 154(b) by 441 days.

(21) Appl. No.: 17/916,381

(22) PCT Filed: Apr. 17, 2020

(86) PCT No.: PCT/JP2020/016897
§ 371 (c)(1),
(2) Date: Sep. 30, 2022

(87) PCT Pub. No.: WO2021/210167
PCT Pub. Date: Oct. 21, 2021

(65) Prior Publication Data
US 2023/0152143 A1 May 18, 2023

(51) Int. Cl.
*G01G 13/00* (2006.01)
*B65D 88/26* (2006.01)
*G01G 19/387* (2006.01)

(52) U.S. Cl.
CPC ........... *G01G 13/006* (2013.01); *B65D 88/26* (2013.01); *G01G 19/387* (2013.01)

(58) Field of Classification Search
CPC .... G01G 13/006; G01G 13/18; G01G 19/387; B65D 88/26
See application file for complete search history.

(56) References Cited

U.S. PATENT DOCUMENTS 4,545,446 A * 10/1985 Kokabu ................ G01G 13/18
105/282.2
4,807,711 A * 2/1989 O'Brien ............... G01G 19/393
177/112
(Continued)

FOREIGN PATENT DOCUMENTS

CN 204301843 U 4/2015
CN 108482894 A 9/2018
(Continued)

OTHER PUBLICATIONS

Computer translation of JP 2001-146319 downloaded from the JPO website on Apr. 24, 2025.*
(Continued)

*Primary Examiner* — Randy W Gibson
(74) *Attorney, Agent, or Firm* — Norris McLaughlin, P.A.

(57) ABSTRACT

A hopper attachment structure is provided that allows a hopper to be removably attached to a driving unit. The hopper has an outlet in a body thereof and a gate driven to open and close by the driving unit. The outlet of the hopper is allowed to open and close with the gate. The driving unit has an engaging protrusion and a support protrusion. The hopper further has an attachment bracket extending from the body. The attachment bracket has a hook portion engageable with the engaging protrusion and also has a contact portion allowed to contact the support protrusion. The hopper is attachable to the driving unit by having the hook portion of the attachment bracket engaged with the engaging protrusion of the driving unit and by further having the contact portion of the attachment bracket supportably contact the support protrusion of the driving unit.

3 Claims, 9 Drawing Sheets

(56) References Cited

U.S. PATENT DOCUMENTS

| | | | |
|---|---|---|---|
| 5,379,923 | A | 1/1995 | Sagastegui et al. |
| 5,611,437 | A * | 3/1997 | Okada ................. G01G 19/303 209/912 |
| 6,271,486 | B1 * | 8/2001 | Franklin .................. F16K 3/03 251/212 |
| 7,053,317 | B2 | 5/2006 | Asai et al. |
| 8,991,656 | B2 * | 3/2015 | Suzuki ................ G01G 19/393 222/344 |
| 10,018,496 | B2 | 7/2018 | Morimoto et al. |
| 10,782,180 | B2 | 9/2020 | Takeichi et al. |

FOREIGN PATENT DOCUMENTS

| | | |
|---|---|---|
| JP | H01-88897 U | 6/1989 |
| JP | 2001-148319 A | 5/2001 |
| JP | 2002-168681 A | 6/2002 |
| JP | 2010-281745 A | 12/2010 |
| JP | 2012-237643 A | 12/2012 |
| JP | 5731273 B2 | 4/2015 |
| JP | 2017-15600 A | 1/2017 |
| JP | 3227867 U | 6/2019 |
| WO | 2018/056182 A1 | 3/2018 |

OTHER PUBLICATIONS

Omputer translation of JP 2012-237643 downloaded from the JPO website on Apr. 24, 2025.*

* cited by examiner

HOPPER ATTACHMENT STRUCTURE AND WEIGHING DEVICE COMPRISING SAME

TECHNICAL FIELD

This invention relates to a hopper attachment structure for use in attachment of hoppers that temporary retain and then discharge items, and a weighing apparatus equipped with hopper attachment structure.

BACKGROUND ART

Patent literature 1 describes an example of combination scales; weighing apparatuses used to combine and weigh items. This combination scale is equipped with, in an upper part of its body, a dispersion feeder and a plurality of linear feeders. The dispersion feeder radially disperses and transports supplied items. The linear feeders receive the items from the dispersion feeder and transport them further outward. This apparatus is further equipped with, in an outer circumference of its body, a plurality of feeding hoppers and a plurality of weighing hoppers. The feeding hoppers temporarily retain and then discharge the items received from the linear feeders. The weighing hoppers temporarily retain and weigh the items received from the feeding feeders.

In the known combination scales, combinatorial computations are executed based on the weights of items in a plurality of weighing hoppers to select a combination of hoppers containing the items of a weight that stays within a predetermined range of weights. Then, gates of the selected hoppers are opened to discharge the items. The discharged items are guided and collected toward the center of the body through a collection chute and then thrown into a packaging apparatus disposed down below.

In combination scales used to weigh foodstuffs, broken pieces or scraps of food may often adhere to the units and devices of the scales. In such combination scales, therefore, the hoppers may be removably attached to the body. Thus, the hoppers may be readily removed from the body and cleaned to wash off the adhered item pieces or scraps.

Patent literature 1 describes a weighing apparatus equipped with a hopper attachment structure that facilitate the removal of hoppers. In this apparatus, a pair of upper and lower support bars are disposed horizontally on the rear surface of each hopper, and a pair of upper and lower hangers are disposed on the outer surface of a driving unit attached to the body of this apparatus. The support bars are fitted from the upper direction into grooves formed upward in the hangers, so that the hopper is securely attached to the driving unit in a certain direction and angle.

CITATION LIST

Patent Literature

Patent literature 1: Utility Model Registration No. 3221867

SUMMARY OF THE INVENTION

Technical Problems

The hangers used in the hopper attachment structure described in patent literature 1 are extending from a flat base portion, and this flat base portion is fitted to the front surface of the driving unit with bolts. As a result of this structure, a laterally long, upward step substantially as thick as the base portion is formed in an upper end of the flat base portion. The broken pieces or scraps of items described earlier may be likely to adhere to this step, and may be even more likely to get stuck in a gap generated between the base portion and the front surface of the driving unit. These pieces or scraps of items caught and stuck in such a step or a gap may easily become a breeding ground for bacteria and should desirably be carefully cleaned off. In combination scales equipped with multiple hoppers, the cleaning should be performed more meticulously and carefully, requiring a great deal of labor and troubles.

This invention was accomplished to address these issues of the known art and is directed to providing a hopper attachment structure that can facilitate a cleaning operation without the risk of contaminating a hopper with unremoved broken pieces or scraps of items to be weighed, and a weighing apparatus equipped with such a hopper attachment structure.

Technical Solution

To this end, this invention provides the following technical features.

1] A hopper attachment structure that allows a hopper to be removably attached to a driving unit,
the hopper having an outlet in a body thereof and a gate driven to open and close by the driving unit, the outlet of the hopper being allowed to open and close with the gate,
the driving unit having an engaging protrusion and a support protrusion,
the hopper further having an attachment bracket extending from the body, the attachment bracket having a hook portion engageable with the engaging protrusion and also having a contact portion allowed to contact the support protrusion,
the hopper being attachable to the driving unit by having the hook portion of the attachment bracket engaged with the engaging protrusion of the driving unit and by further having the contact portion of the attachment bracket supportably contact the support protrusion of the driving unit.

In the known art, the flat base portion with hangers may be fitted to the front surface of the driving unit with bolts. This, however, may no longer be necessary because the hopper attachment structure described herein uses the driving unit equipped with; the engaging protrusion supportably engageable with the attachment bracket of the hopper, and the support protrusion allowed to supportably contact the contact portion of the attachment bracket. This may solve the problem with the known art; a step or a gap likely to catch and retain broken pieces or scraps of items. Further advantageously, broken pieces or scraps of items may be unlikely to get stuck in the engaging protrusion or the support protrusion, because upper parts of these protrusions are covered with the hook portion and the contact portion of the attachment bracket of the hopper. Such pieces or scraps, if they happen to get stuck on these protrusions, may be easily removed by cleaning.

The contact portion and the hook portion of the hopper may be formed by processing the attachment bracket in part into different shapes. Thus, an additional member(s) may need not be prepared, for example, support bars as hanger catchers. This may lead to cost reduction and weight reduction of the whole hopper.

2] In a preferred embodiment of this disclosure, the engaging protrusion is formed on each of lateral surfaces on both sides of the driving unit, the support protrusion is formed on each of the lateral surfaces, and a pair of the attachment brackets facing each other are extended from the body.

According to this embodiment, the hook portions of the paired attachment brackets extended from the body are engaged with the engaging protrusions on the lateral surfaces of the driving unit, and the contact portions of the attachment brackets are brought into contact with the support protrusions on the lateral surfaces of the driving unit. Through these simple actions alone, the hopper may be readily attached to the driving unit. Further, the hopper may be easily removed by simply lifting the body to disengage the hook portions from the engaging protrusions.

3] In other embodiments of this invention, the engaging protrusion formed on one of the lateral surfaces of the driving unit is a boss portion that pivotally and rotatably supports a driving arm used to open and close the gate.

According to these embodiments, the boss portion that pivotally and rotatably supports the driving arm is used as an engaging protrusion on one lateral surface. This may favorably reduce the number of components, possibly leading to cost reduction, as compared with a dedicated protrusion for engagement being prepared apart from the boss portion.

4] In other embodiments of this invention, the boss portion that pivotally and rotatably supports the driving arm is screwed into the one of the lateral surfaces of the driving unit.

According to these embodiments in which the boss portion per se is directly screwed into the lateral surface of the driving unit, any particular fitting member may be unnecessary.

5] In other embodiments of this invention, the support protrusions on the lateral surfaces of the driving unit are protruding more toward the body than the engaging protrusions, and the support protrusions contact the contact portions of the attachment brackets to support the attachment brackets from underneath.

According to these embodiments, the hopper, which is supportably engaged with the engaging protrusions on the lateral surfaces of the driving unit, may rotate under its own weight around the point of engagement, causing downward displacement. At that time, the support protrusions closer to the body than the point of engagement may receive the contact portions of the attachment brackets. Thus, the whole hopper may be reliably supported at a predetermined position in a certain direction.

6] A weighing apparatus according to this invention includes:
a center base body;
a dispersion feeder disposed in an upper part of the center base body, the dispersion feeder being driven to disperse and radially transport an item;
a plurality of linear feeders that transport outward the item received from the dispersion feeder;
a plurality of driving units in an outer circumference of the center base body; and
a plurality of hoppers removably attachable to the plurality of driving units, the plurality of hoppers serving to temporarily retain and discharge the item, the plurality of hoppers each having an outlet in a body thereof and further having a gate driven to open and close by a respective one of the plurality of driving units, the outlets of the plurality of hoppers being allowed to open and close with the gates,
the weighing apparatus further including the hopper attachment structure recited in one of 1] to 5] that allows the plurality of hoppers to be removably attached to the plurality of driving units.

In the weighing apparatus according to this invention, the driving unit is provided with the engaging protrusion and the support protrusion; the former is engageable with the attachment bracket, and the latter supportably contacts the contact portion of the attachment bracket. The hopper may be attachable to the driving unit equipped with these elements. Thus, a long step or a gap that may often catch the item pieces and scraps may no longer be formed, unlike the known art. This may greatly reduce an amount of labor required of a cleaning process, achieving a faster and easier cleaning operation than time-consuming cleaning that involves removal of item pieces and scraps left in such a step or a gap.

Effects of the Invention

As described thus far, this invention may successfully provide a hopper attachment structure that can facilitate a cleaning operation without the risk of contaminating a hopper with any unremoved broken pieces or scraps of items to be weighed, and a weighing apparatus equipped with the hopper attachment structure.

DESCRIPTION OF EMBODIMENTS

Embodiments of this invention are hereinafter described in detail with reference to the accompanying drawings.

Figure 1:
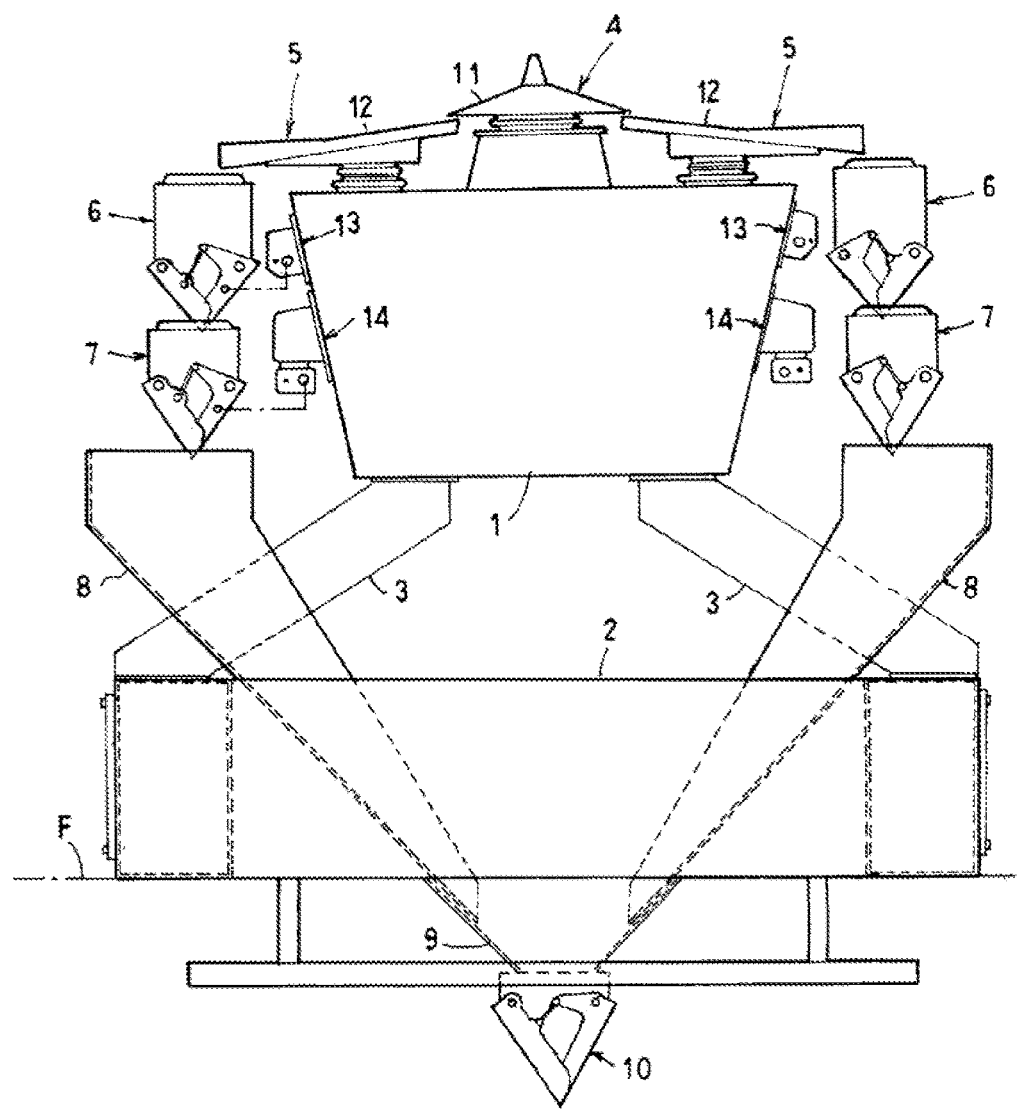
FIG. 1 is a longitudinal front view illustrating a schematic structure of a combination scale according to an embodiment of this invention.

FIG. 1 is a longitudinal front view illustrating a schematic structure of a combination scale according to an embodiment of this invention.

This combination scale may be used in a packaging line in which items, for example, snacks, sweets or any other foodstuffs are weighed, and the items having a certain weight that falls within a predetermined range of weights are discharged and thrown into a packaging apparatus disposed below, not illustrated in the drawings, and then packed into bags.

This combination scale includes, as its main body, a center base body 1 having a substantially columnar shape. The center base body 1 is supported on a pedestal 2 at the center of this scale through a plurality of leg portions 3. The pedestal 2 has an opening in which a lower part of the combination scale is insertable. This pedestal is placed on a floor surface F.

A dispersion feeder 4 is disposed above the center base body 1. The dispersion feeder 4 receives the items dropping from a feeder not illustrated in the drawings and transports the received items by radially dispersing them through vibrations. A plurality of linear feeders 5 are disposed around the dispersion feeder 4. These linear feeders 5 receive the items from the dispersion feeder 4 and linearly transports the items outward through vibrations. This combination scale further has, beneath the ends of the linear feeders 5, feeding hoppers 6 and weighing hoppers 7 that are disposed correspondingly to the linear feeders 5. A plurality of weighing units each having the linear feeder 5, feeding hopper 6 and weighing hopper 7 are circularly arranged around the center base body 1.

A collection chute 8 is disposed at a position below the weighing hoppers 7 that are circularly arranged. The collection chute 8 receive the items discharged from a combination of selected ones of the weighing hoppers 7 containing the items having a summed weight that falls within a predetermined range of weights. At a position below the collection chute 8 is disposed a collection funnel 9 that collects the items dropping from the collection chute 8. A collection hopper 10 is disposed below the collection funnel 9. The items dropped and guided along the collection funnel 9 toward the center are received and temporarily retained by the collection hopper 10. Then, the collection hopper 10 discharges the items based on an item discharge request from the packaging apparatus.

The dispersion feeder 4 disposed above the center base body 1 includes a top cone 11 and a vibrator not illustrated in the drawings. The top cone 11 is supplied with the items and is driven to vibrate by the vibrator. The linear feeders 5 each have a trough (feeder pan) 12 and a vibrator not illustrated in the drawings. The trough has a long shape along the inner-outer direction of this scale and is driven to vibrate by the vibrator.

Driving units 13 and driving units 14 are mounted to the outer circumference of the center base body 1. The driving units 13 open and close gates of the feeding hoppers 6. The driving units 14 open and close gates of the weighing hoppers 7 and also measure the weights of items in the weighing hoppers 7. The feeding hoppers 6 and the weighing hoppers 7 are each removably attached, in the manner of a hook, to a respective one of these driving units 13 and 14.

Figure 2:
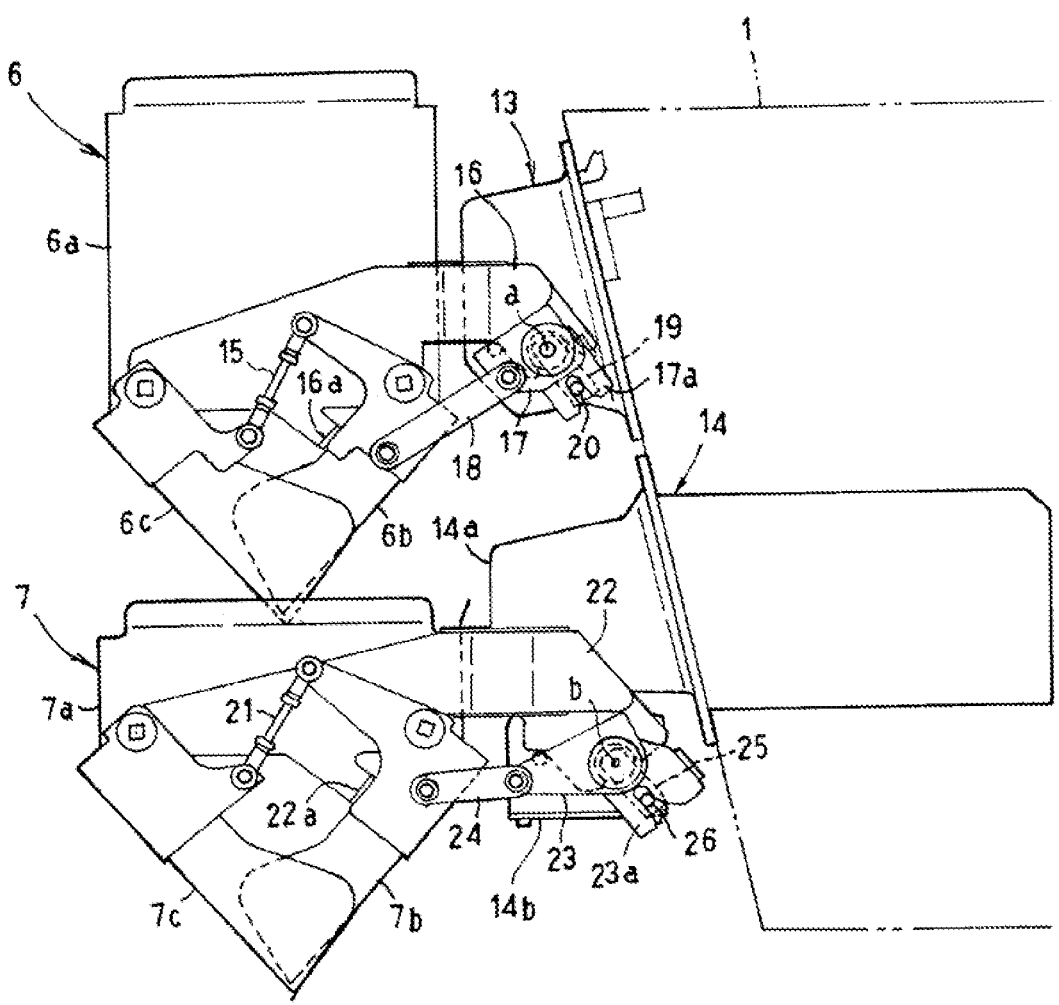
FIG. 2 is a lateral view from one side of hopper attachment units.
Figure 3:
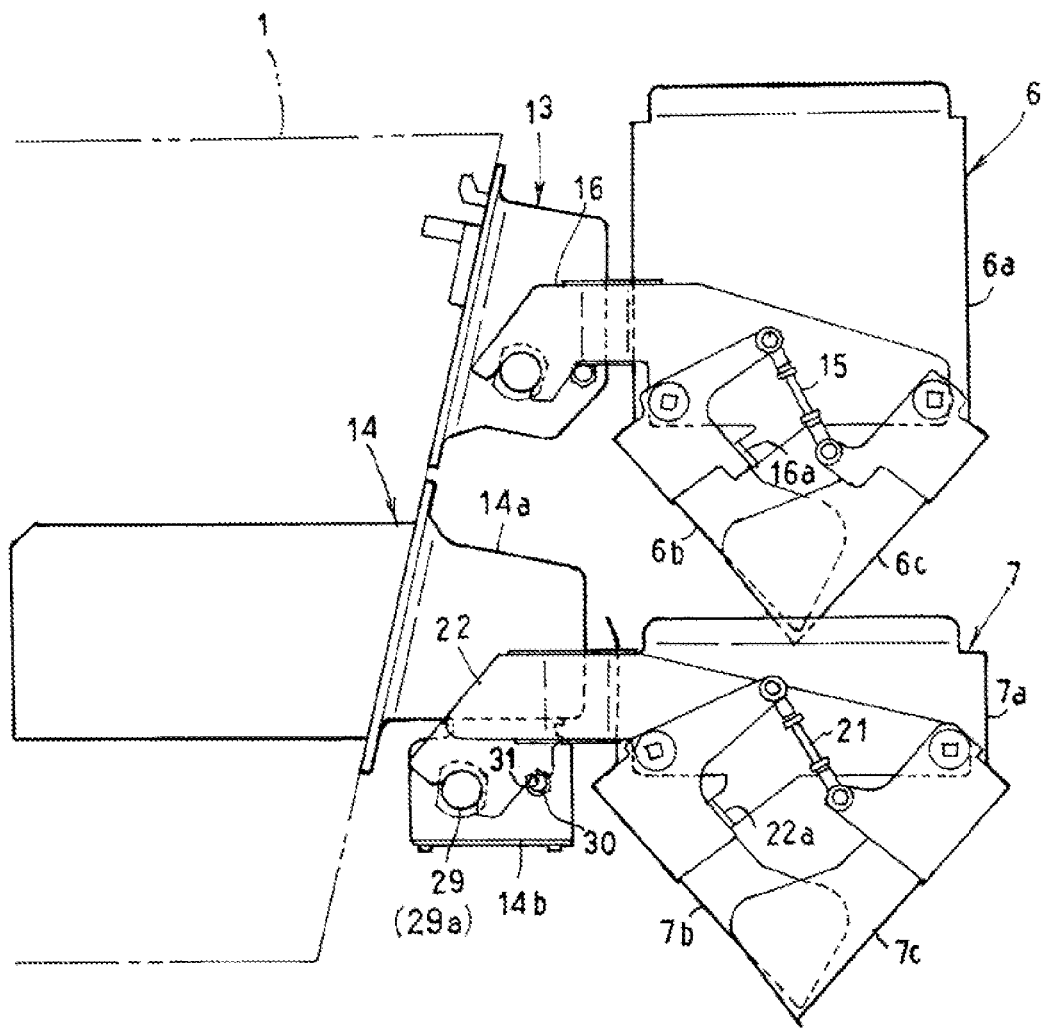
FIG. 3 is a lateral view from another side of the hopper attachment units.

FIG. 2 is a lateral view from one side of hopper attachment units for the hoppers 6 and 7. FIG. 3 is a lateral view from another side of the hopper attachment units for the hoppers 6 and 7.

The feeding hopper 6 has a body 6a and a pair of inner and outer gates 6b and 6c. The body 6a is formed in an angled tubular shape and has an opening vertically penetrating therethrough. The gates 6b and 6c are supported in a manner that these gates are allowed to swing and thereby open and close. The gates 6b and 6c are interlocked with each other with a synchronization link 15. A pair of attachment brackets 16 are fixed by welding to the outer lateral surfaces on both sides of the body 6a.

On the outer lateral surface of one of the attachment brackets 16 that drives the gates 6b and 6c to open and close, a working link 17 is supported rotatably around a lateral fulcrum "a", as illustrated in FIG. 2. This working link 17 is interlocked with the inner gate 6b through a connection link 18.

On one of the lateral surfaces of the driving unit 13, a driving arm 19 is pivotally and rotatably supported, as illustrated in FIG. 2. The driving arm 19 is driven to rotate around the lateral fulcrum "a" forward and backward by a built-in motor. The driving arm 19 has a driving pin 20 at a free end thereof, and this driving pin 20 is engaged with an engageable portion 17a formed at an end of the working link 17. Thus, the inner and outer gates 6b and 6c are synchronously opened and closed in response to the forward and backward rotations of the driving arm 19.

A stopper 16a bending laterally outward is extended from the attachment bracket 16. This stopper 16a contacts the inner gate 6b to regulate the limit of its swing motion in the direction of gate closure, so that the gates 6b and 6c are both kept at predetermined positions of hopper closure.

As with the feeding hopper 6, the weighing hopper 7 has a body 7a and a pair of inner and outer gates 7b and 7c. The body 7a is formed in an angled tubular shape and has an opening vertically penetrating therethrough. The gates 7b and 7c are supported in a manner that these gates are allowed to swing and thereby open and close. The gates 7b and 7c are interlocked with each other with a synchronization link 21. A pair of attachment brackets 22 are fixed by welding to the outer lateral surfaces on both sides of the body 7a.

On the outer lateral surface of one of the attachment brackets 22 that drives the gates 7b and 7c to open and close, a working link 23 is supported rotatably around a lateral fulcrum "b", as illustrated in FIG. 2. This working link 23 is interlocked with the inner gate 7b through a connection link 24.

The driving unit 14 of the weighing hopper 7 is equipped with an upper case 14a and a lower case 14b. The lower case 14b is supported in a manner that this lower case is vertically displaceable relative to the upper case 14a. A load that acts upon the lower case 14b is measured by a load sensor housed in the upper case 14a.

As illustrated in FIG. 2, a driving arm 25 is pivotally and rotatably supported on one lateral surface of the lower case 14b. This driving arm 25 is driven to rotate forward and backward around the lateral fulcrum "b" by a built-in motor. The driving arm 25 has a driving pin 26 at a free end thereof, and this driving pin 26 is engaged with an engageable portion 23a formed at an end of the working link 23. Thus, the inner and outer gates 7b and 7c are synchronously opened and closed in response to the forward and backward rotations of the driving arm 25. Further, a bent stopper 22a extended from the attachment bracket 22 contacts the inner gate 7b and thereby regulates movement of this gate, allowing the gates 7b and 7c to be kept at predetermined positions of hopper closure.

Since the structure for detachably attaching the feeding hopper 6 and weighing hopper 7 to the driving units 13 and 14 are basically the same, the attachment structure of the weighing hopper 7 will be typically described below.

Figure 4:
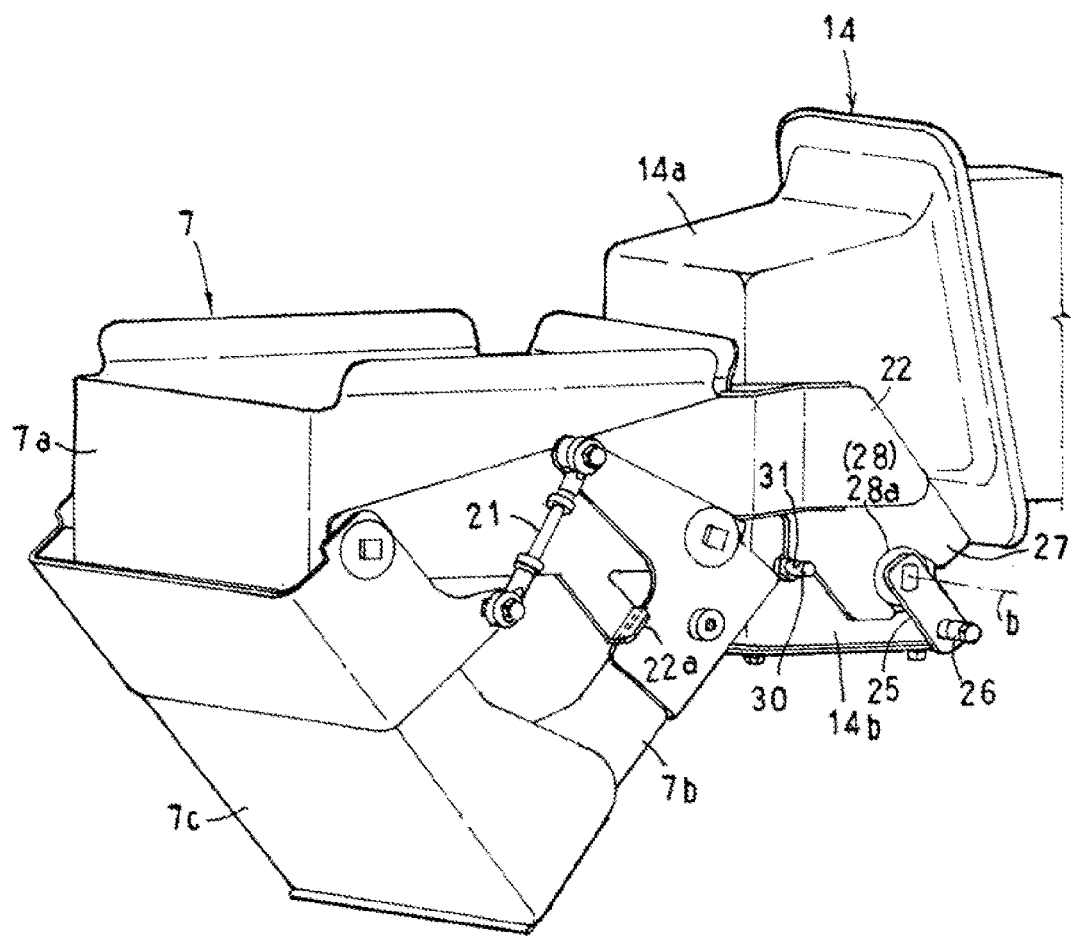
FIG. 4 is a perspective view from one lateral side of structural details for weighing hopper attachment.
Figure 5:
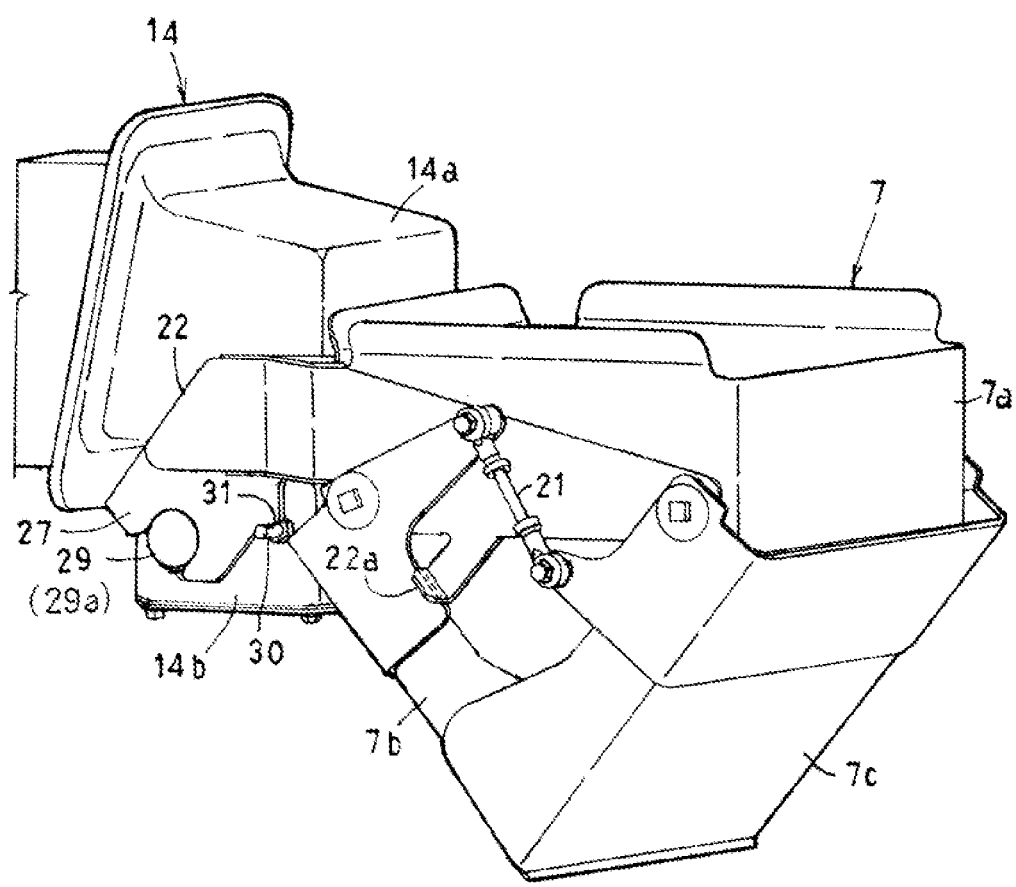
FIG. 5 is a perspective view from another lateral side of the structural details for weighing hopper attachment.
Figure 6:
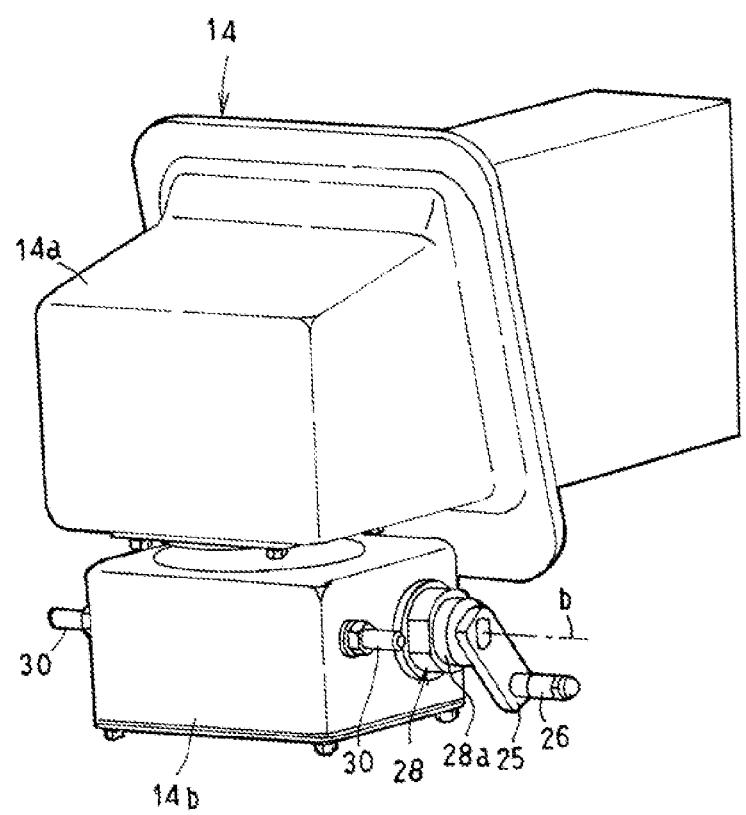
FIG. 6 is a perspective view from one lateral side of a driving unit mounted for a weighing hopper.
Figure 7:
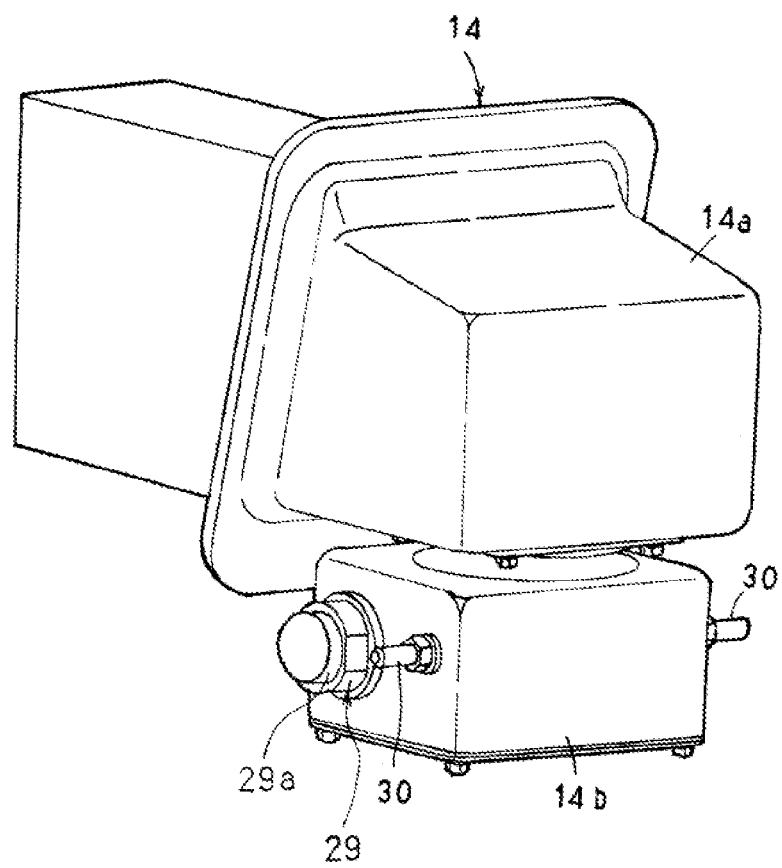
FIG. 7 is a perspective view from another lateral side of the driving unit mounted for a weighing hopper.

FIG. 4 is a perspective view from one lateral side of structural details for attachment of the weighing hopper 7. This drawing shows the structure of FIG. 2 from which the working link 23 and the connection link 24 have been removed. FIG. 5 is a perspective view from another lateral side of the structural details for attachment of the weighing hopper 7. FIG. 6 is a perspective view from one lateral side of the driving unit 14 mounted for the weighing hopper 7. FIG. 7 is a perspective view from another lateral side of the driving unit 14 mounted for the weighing hopper 7.

The paired attachment brackets 22, which are respectively coupled to the lateral surfaces of the body 7a of the weighing hopper 7, are extended toward the rear side, i.e., toward the driving unit 14. These attachment brackets 22 are facing each other and respectively have, at an end of extension thereof, a hook portion 27 with an opening directed downward.

As illustrated in FIG. 6, a boss portion 28; an engaging protrusion that pivotally and rotatably supports the driving arm 25, is securely screwed into one lateral surface of the lower case 14b of the driving unit 14. This boss portion 28 has, in a part thereof, a circular portion 28a. This circular portion 28a is engageable with the hook portion 27 of one of the attachment brackets 22 without any wobble. The boss portion 28, which pivotally and rotatably support the driving arm 25 that drives the gates 7b and 7c to open and close, is thus used as an engaging protrusion that supportably catches the attachment bracket 22. This may favorably reduce the number of components, possibly leading to cost reduction, as compared with a dedicated protrusion for engagement being prepared apart from the boss portion 28.

As illustrated in FIG. 7, a boss portion 29; an engaging protrusion, is screwed into the other lateral surface of the lower case 14b. This boss portion 29 has, in a part thereof, a circular portion 29a. This circular portion 29a is engageable with the hook portion 27 of the other attachment bracket 22 without any wobble.

Support pins 30; support protrusions, are respectively screwed securely into the lateral surfaces of the lower case 14b at positions on the outer side than the boss portions 28 and 29, i.e., at positions closer to the hopper.

Figure 8:
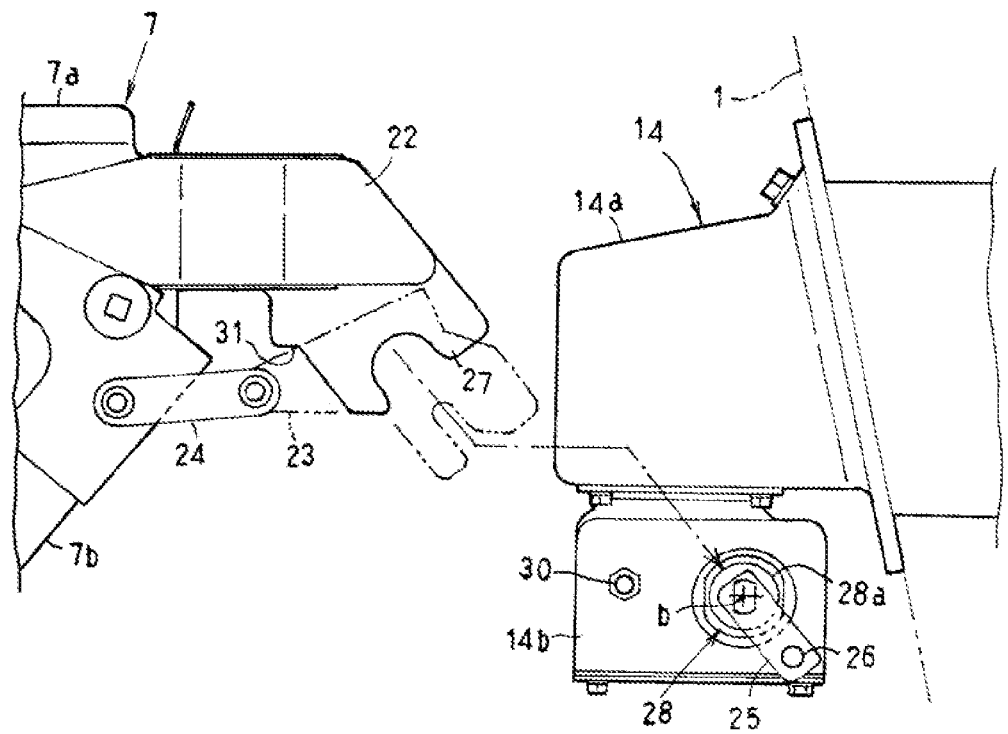
FIG. 8 is a lateral view from one side of how the weighing hopper is attachable.
Figure 9:
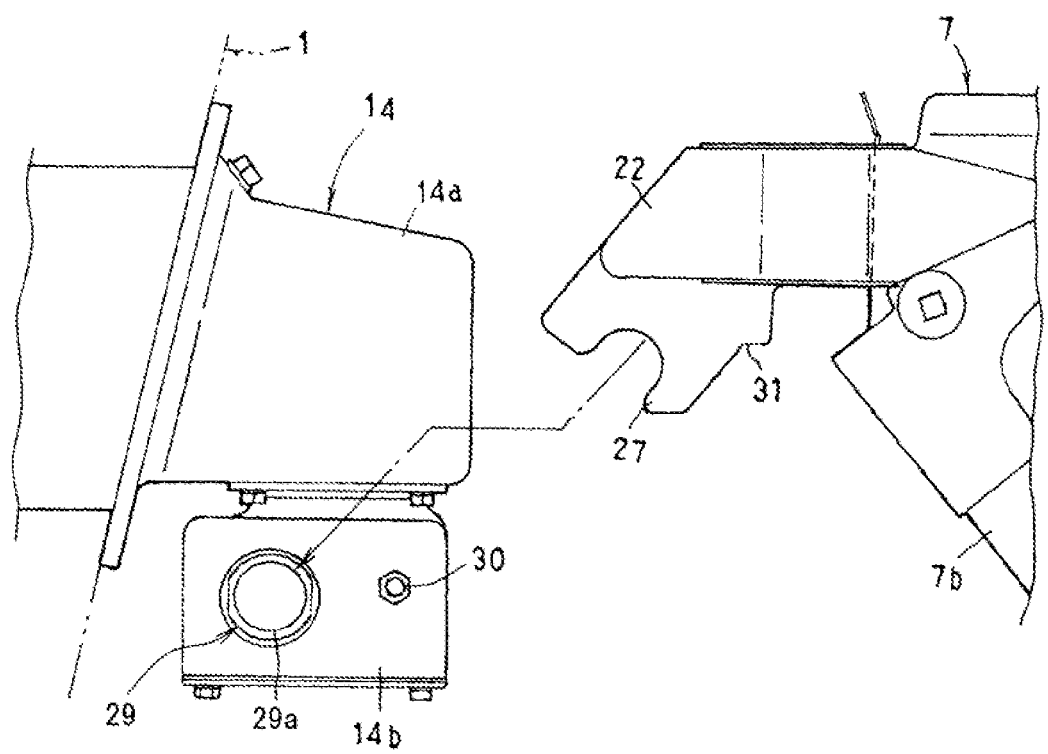
FIG. 9 is a lateral view from another side of how the weighing hopper is attachable.

FIG. 8 is a lateral view from one side of how the weighing hopper 7 is attachable. FIG. 9 is a lateral view from another side of how the weighing hopper 7 is attachable.

In the hopper attachment structure described thus far, the weighing hopper 7 is moved, from outward and upward, toward the driving unit 14 mounted to the outer circumference of the center base body 1, and the hook portions 27 of the attachment brackets 22 on both sides are engaged with the boss portions 28 and 29; engaging protrusions, disposed on the lateral surfaces of the lower case 14b. Then, contact portions 31 of the attachment brackets 22 at lower edges thereof are brought into contact with the support pins 30 of the lower case 14b.

The contact portions 31 each have an angled part. These angled parts of the contact portions 31 contact the support pins 30 in two directions; upper direction and inner direction (on the driving-unit side). As a result, the weighing hopper 7 is laterally positioned in a predetermined direction and angle in which forward, backward and downward movements are preventable. The weighing hopper 7 thus positioned is then attached to the lower case 14b.

The gates 7b and 7c may be allowed to open and close by having the working link 23 engaged with the driving pin 21 at the same time when the hopper is attached to the driving unit.

The weighing hopper 7 may be easily removed from the scale when the hook portions 27 are pulled off the engaging protrusions 28 and 29, with the attached weighing hopper 7 being lifted upward and outward.

According to this embodiment, the driving unit 14 may only need to have the following elements on its lateral surfaces for attachment of the weighing hopper 7; the boss portions 28 and 29 supportably engageable with the paired attachment brackets 22 of the weighing hopper 7, and the support pins 30 that supportably contacts the contact portions 31 of the attachment brackets 22. Therefore, front surfaces of the upper and lower cases 14a and 14b of the driving unit 14, i.e., the faces facing the body 7a of the weighing hopper 7, are unoccupied, flat surfaces, as illustrated in FIGS. 6 and 7. The problem with the known art described in patent literature 1 is a step and a gap inevitably formed when the flat base portion of the hanger is attached to the front surface of the driving unit with bolts. This embodiment, on the other hand, may certainly avoid such a problem.

Items to be weighed may leave some broken pieces or scraps, which, however, may be unlikely to stay on the front surfaces of the upper and lower cases 14a and 14b of the driving unit 14 with no such a step or a gap as described in the known art. Further, the boss portions 28 and 29 and the support pins 30 on the lateral surfaces of the upper and lower cases 14a and 14b of the driving unit 14 are covered with the attachment brackets 22 of the attached weighing hopper 7. These portions and pins, therefore, may be safely protected from being contaminated with broken pieces or scraps of items and may be easily cleaned even if such contamination occurs.

Thus, cleaning may be facilitated and speedily performed, as compared with the known art of patent literature 1 which requires careful cleaning to remove broken pieces and scraps of items left in a small step or gap.

The elements required of the driving unit 14 for hopper attachment may be the boss portions 28 and 29 and the support pins 30 alone, which may eliminate the need to prepare a pair of upper and lower hangers as described in patent literature 1. In the weighing hopper 7 according to this embodiment, the paired attachment brackets 22 may be processed in part into different shapes to form the hook portions 27 and the contact portions 31. Unlike the known art of patent literature 1, a pair of upper and lower support bars disposed on the rear surface of the hopper may no longer be necessary. This may lead to cost reduction and weight reduction of the whole hopper.

Other Embodiments

The scope of this invention may include the following modes.

1] In the earlier embodiment, the boss portions 28 that pivotally support the driving arm 25 are also used as engaging protrusions supportably engageable with one of the hook portions 27 on the lateral sides of the hopper 7. Instead, engaging protrusions solely for the engagement purpose may be prepared apart from the boss portions 28 that pivotally support the driving arm 25.

2] The support pin 30 may be securely hammered into the lateral surfaces of the case.

3] In the weighing apparatus according to the earlier embodiment, a plurality of weighing units each having the linear feeder, feeding hopper 6 and weighing hopper 7 are circularly arranged. This invention may be applicable to a differently structured weighing apparatus(es) in which, multiple weighing units are arranged otherwise, for example, laterally arranged in a row.

REFERENCE SIGNS LIST 1 center base body
4 dispersion feeder
5 linear feeder
6 feeding hopper
7 weighing hopper 7a body
7b, 7c gate
13, 14 driving unit
22 attachment bracket
27 hook portion
28, 29 boss portion (engaging protrusion)
30 support pin (support protrusion)
31 contact portion

The invention claimed is:

1. A hopper attachment structure, wherein
the hopper attachment structure is configured to allow the hopper to be removably attached to a driving unit, and
the hopper comprises:
an outlet in a body thereof; and
a gate driven to open and close by the driving unit,
the outlet of the hopper being allowed to open and close with the gate,
the driving unit comprising an boss portion and a support pin,
the hopper further comprising an attachment bracket extending from the body, the attachment bracket comprising;
at a distal end thereof, a hook portion engageable with the boss portion, and
at a portion thereof behind and contiguous with the hook portion, a contact portion configured to contact the support pin,
the contact portion having an angled part configured to contact the support pin so that the support pin supports the hook portion in two directions, one of the directions being an upper direction and the other being an inner direction toward the driving unit, so that the hopper is laterally positioned in a predetermined direction and angle in which forward, backward and downward movements are prevented,
the hopper being attachable to the driving unit by having the hook portion of the attachment bracket engaged with the boss portion of the driving unit and by further having the contact portion of the attachment bracket supportably contact the support pin of the driving unit, wherein:
the boss portion is formed on each of lateral surfaces on both sides of the driving unit,
the support pin is formed on each of the lateral surfaces,
a pair of the attachment brackets facing each other are extended from the body,
the boss portion pivotally and rotatably supports a driving arm used to open and close the gate,
the boss portion that pivotally and rotatably supports the driving arm is screwed into the one of the lateral surfaces of the driving unit,
the support pins on the lateral surfaces of the driving unit are protruding more toward the body than the engaging protrusions, and
the support pins contact the contact portions of the attachment brackets to support the attachment brackets from underneath.

2. A weighing apparatus, comprising:
a center base body;
a dispersion feeder disposed in an upper part of the center base body, the dispersion feeder being driven to disperse and radially transport an item;
a plurality of linear feeders that transport outward the item received from the dispersion feeder;
a plurality of driving units in an outer circumference of the center base body; and
a plurality of hoppers removably attachable to the plurality of driving units, the plurality of hoppers serving to temporarily retain and discharge the item,
the plurality of hoppers each comprising:
an outlet in a body thereof; and
a gate driven to open and close by a respective one of the plurality of driving units, the outlets of the plurality of hoppers being allowed to open and close with the gates,
the weighing apparatus further comprising the hopper attachment structure according to claim 1 that is configured to allow the plurality of hoppers to be removably attached to the plurality of driving units.

3. A weighing apparatus comprising:
a center base body;
a dispersion feeder disposed in an upper part of the center base body, the dispersion feeder being driven to disperse and radially transport an item;
a plurality of linear feeders that transport outward the item received from the dispersion feeder;
a plurality of driving units in an outer circumference of the center base body; and
a plurality of hoppers removably attachable to the plurality of driving units, the plurality of hoppers serving to temporarily retain and discharge the item,
the plurality of hoppers each comprising:
an outlet in a body thereof; and
a gate driven to open and close by a respective one of the plurality of driving units, the outlets of the plurality of hoppers being allowed to open and close with the gates,
the weighing apparatus further comprising the hopper attachment structure according to claim 1 that is configured to allow the plurality of hoppers to be removably attached to the plurality of driving units.

* * * * *